Nov. 26, 1963  W. SCHMIDT  3,111,928
DRIVING ARRANGEMENT FOR LAND-, WATER- AND AIR-CRAFT
Filed Aug. 8, 1960
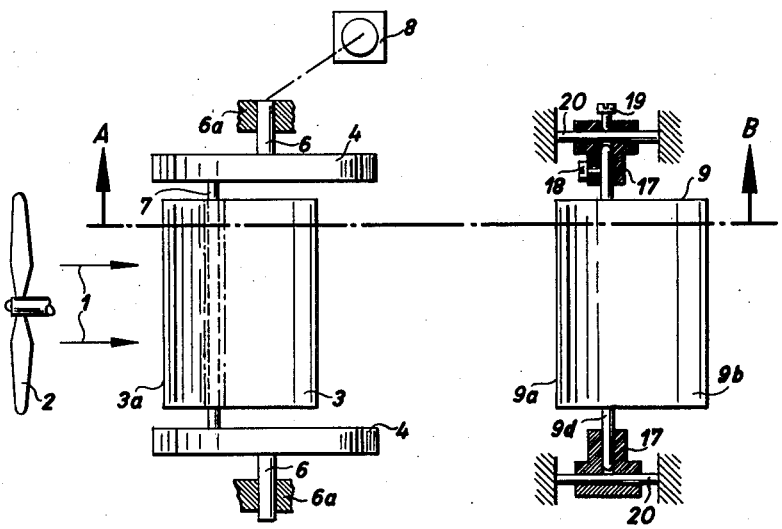
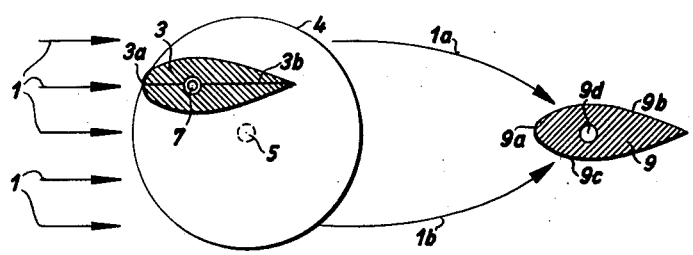
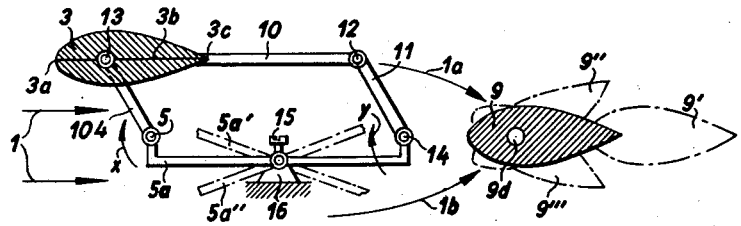
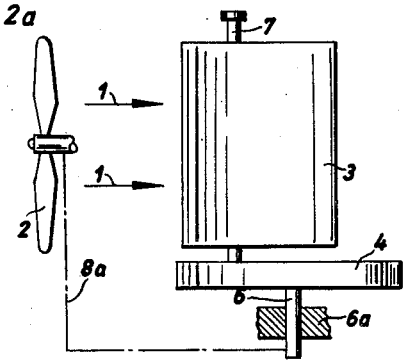
INVENTOR.
Wilhelm Schmidt
BY
his ATTORNEY United States Patent Office 3,111,928
Patented Nov. 26, 1963

3,111,928
DRIVING ARRANGEMENT FOR LAND-, WATER- AND AIR-CRAFT
Wilhelm Schmidt, Dresden, Germany, assignor to Forschungszentrum der Luftfahrtindustrie, Dresden, Germany
Filed Aug. 8, 1960, Ser. No. 48,231
Claims priority, application Austria Jan. 9, 1960
16 Claims. (Cl. 115—.5)

The present invention relates to a driving arrangement for land-, water- and aircraft, and more particularly to a driving arrangement for conveyances of the type in which the propulsion is brought about by a fluid stream.

A fluid stream develops behind the airscrew of a propeller-driven airplane, behind the mouth of the exhaust nozzle in a jet engine for airplanes or rockets, as well as behind the propeller of a watercraft. The propelling thrust is brought about by the difference between the speed of the fluid stream and the forward speed of the conveyance. The thrust increases with increasing cross-sectional area of the fluid stream and with increasing difference between the aforementioned speeds. It is also known that the efficiency of and the suppression of noise in such driving arrangements will improve if the difference between the speed of the fluid stream and the forward speed of the conveyance decreases, and it is also desirable to produce a fluid stream of comparatively small cross-section area without reducing the propelling thrust. According to certain prior proposals which are based on the well known Knoller-Betz or Katzmayr effect a higher efficiency of drives producing a fluid stream may be brought about by placing into the fluid stream a suitably shaped body and by deflecting the fluid stream against the opposite surfaces of such body which sides are substantially parallel with the direction of the fluid stream. For example, it was already proposed to deflect the fluid stream against the opposite sides of a profiled body by a device which rotates about an axis parallel with the direction of the fluid flow. However, such arrangements cause the fluid stream to spin which adversely affects the propelling thrust of the stream.

An important object of the present invention is to provide an improved driving arrangement for land-, water- and aircraft which is also based on the Knoller-Betz or Katzmayr effect and wherein the deflection of the fluid stream against the opposite sides of a profiled body is brought about in such manner that no twisting or spinning of the stream takes place during such deflection, which is capable of deflecting the fluid stream at very high frequency and in which the deflecting means and the profiled body may be adjusted in all directions with respect to each other as well as with respect to the fluid stream.

With the above objects in view, the invention resides in the provision of a driving arrangement comprising essentially a profiled body formed with two opposite sides which body is placed into the fluid stream rearwardly of a propeller screw, of the exhaust nozzle of a jet engine or of any other suitable fluid stream producing means, deflecting means preferably assuming the form of an element of airfoil profile which is placed into the fluid stream between the stream producing means and the profiled body, and means eccentrically mounting the deflecting means and adapted to rotate about an axis which is perpendicular to the direction of the fluid stream. When the deflecting means is caused to participate in rotary movements of its supporting means, it simultaneously performs movements in directions substantially transverse to the direction of the fluid stream and thereby deflects the stream against the opposite sides of the profiled body without causing any spinning or twisting of the fluid stream. In fact, the originally straight fluid stream is transformed into a substantially undulated stream and alternately impinges against the opposite sides of the profiled body to produce the aforementioned Knoller-Betz or Katzmayr effect.

The novel features which are considered as characteristic of the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 1 is a schematic top plan view of a driving arrangement embodying one form of my invention;

FIG. 2 is a section taken along the line A—B of FIG. 1, as seen in the direction of arrows;

FIG. 2a is a fragmentary top plan view of a detail constituting a modification of the arrangement shown in FIGS. 1 and 2; and FIG. 3 is a partly elevational and partly sectional view of a further modification.

Referring now in greater detail to the illustrated embodiments, and first to FIGS. 1 and 2, there is shown a driving arrangement which may be utilized in a land-, water- or aircraft and in which the means for producing an air or water stream 1 comprises an airscrew 2. The driving arrangement further comprises a deflecting element 3 which is of airfoil profile (see FIG. 2) and which is rotatably mounted on a shaft 7; the later's axis is perpendicular to the direction of the fluid stream 1 and is eccentric with respect to the common axis of two discoid members 4 which together constitute a rotary means for supporting and mounting the deflecting element 3 in the fluid stream. The coaxial shafts 6 of discoid members 4 are mounted in journal bearings 6a, and the shaft of one of the members 4 is driven by a suitable device, e.g., by an electric motor 8. The planes of rotary members 4 are parallel with the cross-sectional plane of the deflecting element 3 which passes through the line A—B.

As shown in FIGS. 1 and 2, the fluid stream 1 produced by the screw 2 is straight and flows in the direction perpendicular to the leading edge 3a of the deflecting element 3. The common axis 5 of the shafts 6 about which the discoid members 4 rotate is also perpendicular to the direction of fluid stream 1 and, when the element 3 rotates with the discoid members, it alternately deflects the originally straight fluid stream in the direction of arrows 1a, 1b against the opposite sides of a profiled body 9 which preferably assumes the shape of an airfoil and which is mounted rearwardly of the element 3, as seen in the direction of the fluid flow, in such manner that its leading edge 9a is perpendicular to the direction of the fluid stream. The surfaces at the opposite sides of the profiled body are identified by reference numerals 9b and 9c. These surfaces are substantially parallel with the original direction of fluid flow.

The profiled body 9 is rigidly secured to a shaft 9d which is parallel with the leading edge 9a. The ends of the shaft 9d are rotatably mounted in substantially T-shaped bearings 17 and may be fixed in a number of angular positions with respect to the axis of the shaft 9d by a screw 18 or the like. The bearings 17 are slidable along two parallel guide rods 20 and at least one thereof may be releasably fixed to the respective guide rod by a screw 19 or the like. The rods 20 and the bearings 17 permit adjustments in the position of the profiled body 9 in the direction of fluid flow, i.e., toward and away from the deflecting element 3 (see the phantom-line position 9' in FIG. 3). Upon release of the fixing screw 18, the profiled body 9 may be rocked into and beyond the phantom-line positions 9", 9''' of FIG. 3 to vary the angle of impact between the fluid streams 1a, 1b and the surfaces 9b, 9c, respectively.

Referring now to FIG. 2a, it will be noted that the rotary means comprises a single discoid member 4 and that this member is rotated by the stream producing airscrew 2. The operative connection between the screw 2 and the shaft 6 of the member 4 is shown schematically by a phantom line 8a.

When the driving arrangement of FIGS. 1—2 or of FIG. 2a is in actual use, the rotating discoid member or members 4 will cause the deflecting element 3 to perform a movement in parallelism with itself and in directions perpendicular to the direction of the fluid stream 1 so that the stream is alternately deflected in the direction of arrows 1a, 1b and impinges against the surfaces 9b, 9c, respectively, of the profiled body 9. During such movements, the deflecting element 3 may remain in parallelism with itself either because it is rotatable on its shaft 7 and because the axis of the shaft 7 is located in the geometric chord 3b of the element 3, or the element 3 may be positively held in such position by means which will be described in greater detail in connection with FIG. 3. The rotary means including the discoid member or members 4 preferably rotates at a uniform rate of speed so that the deflecting element 3 produces an undulated fluid stream and guides the stream against the surfaces 9b, 9c in a given rhythm. Such deflection of the fluid stream brings about the aforementioned Knoller-Betz or Katzmayr effect resulting in increase of the forward thrust of the driving propeller.

As stated before, it is preferred to mount the deflecting element 3 in such a way that the axis of the shaft 7 is located in the point of attack of the force produced by the fluid stream 1, i.e., in the aerodynamic or hydrodynamic center, because such mounting insures that the deflecting element remains parallel with itself when it must rotate with the discoid member or members 4.

Referring now to FIG. 3, there is shown a system which positively holds the deflecting element 3 in a position of parallelism with itself when the element 3 rotates. The rotary means of FIG. 3 comprises a link 104 which rotates about a pivot 5 provided at the forward end of a two-armed lever 5a. The other end of the link 104 is connected with a shaft 13 which rotatably mounts the deflecting element 3; the axis of rotation of the deflecting element is again located in the geometric chord 3b. The trailing edge 3c of the deflecting element is connected with the forward end of a connecting rod 10 which is rockable about a pivot 12 provided at the free end of a second link-shaped rotary means 11, the latter being rotatable about a pivot 14 provided at the rear end of the lever 5a. As the rotary means 104 and 11 rotate about their respective pivots 5 and 14, the connecting rod 10 holds the deflecting element 3 in a position of parallelism with itself so that the element 3 alternately deflects a straight fluid stream 1 in the direction of arrows 1a, 1b against the opposite sides of the profiled body 9. As mentioned before, the profiled body 9 may be moved toward, into and beyond the phantom line position 9', as well as pivoted between and beyond the phantom line positions 9", 9"'.

The deflecting element 3 and the connecting rod 10, the lever 5a, the front rotary means 104, and the rear rotary means 11 constitute the four links of a deformable parallel motion mechanism in which the composite link 3, 10 is always parallel with the lever or link 5a. As shown, the median portion of the two-armed lever 5a is rockably mounted in a bearing bracket 16 and may be fixed in any desired angular position by a screw 15 or the like so that the deflecting element 3 is shiftable transversely with respect to the direction of fluid flow into a number of different positions. For example, the lever 5a may be rocked between and beyond the phantom-line positions 5a', 5a". The directions in which the links 104 and 11 rotate are indicated by the arrows X, Y, respectively. Furthermore, the lever 5a may be axially shifted in its bearing 16 so that the position of the deflecting element may be simultaneously or selectively adjusted in directions parallel and/or transverse to the direction of the fluid flow. Axial adjustments of the lever 5a will bring about movements of the deflecting element 3 closer to or further away from the profiled body 9. Furthermore, any changes in angular position of the lever 5a will bring about changes in angular position of the element 3 with respect to the direction of the fluid stream.

It will be readily understood that the fluid stream 1 may be produced by means other than the airscrew 2. Thus, if the driving arrangement is installed in a craft which is propelled by a jet engine or the like, the deflecting element 3 is placed behind the mouth of the exhaust nozzle. In a watercraft, the deflecting element is located in water in the rear of the propeller.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a driving arrangement for land-, water- and aircraft of the type which is propelled by a fluid stream, in combination, means for producing a fluid stream; a body of airfoil profile having a leading edge and a first and a second side; means mounting said body in the fluid stream in such manner that the leading edge is perpendicular to the direction of the fluid stream; a deflecting element of airfoil profile having a leading edge and a geometric chord; and rotary means having an axis of rotation perpendicular to the direction of the fluid stream and eccentrically mounting said deflecting element in the fluid stream between said stream producing means and said body in such manner that the leading edge of said deflecting element is perpendicular to and that said geometric chord is parallel with the direction of the fluid stream whereby said element alternately deflects the fluid stream against the sides of said body when rotated by said rotary means.

2. In a driving arrangement for land-, water- and aircraft of the type which is propelled by a fluid stream, in combination, means for producing a fluid stream; a body of airfoil profile having a leading edge and a first and a second side; means mounting said body in the fluid stream in such manner that the leading edge is perpendicular to the direction of the fluid stream; a deflecting element; and rotary means having an axis of rotation perpendicular to the direction of the fluid stream and eccentrically mounting said element in the fluid stream between said stream producing means and said body whereby said element alternately deflects the fluid stream against the sides of said body when rotated by said rotary means.

3. In a driving arrangement for land-, water- and aircraft of the type which is propelled by a fluid stream, in combination, means for producing a fluid stream; a body of airfoil profile having a leading edge and a first and a second side; means mounting said body in the fluid stream in such manner that the leading edge is perpendicular to the direction of the fluid stream; a deflecting element; and rotary means having an axis of rotation perpendicular to the direction of fluid stream and eccentrically mounting said element in the fluid stream between said stream producing means and said body whereby said element alternately deflects the fluid stream against the sides of said body when rotated by said rotary means, said element rotatable with respect to said rotary means about an axis parallel with said first mentioned axis.

4. In a driving arrangement for land-, water- and aircraft of the type which is propelled by a fluid stream, in combination, means for producing a fluid stream; a body of airfoil profile having a leading edge and a first and a second side; means mounting said body in the fluid stream in such manner that the leading edge is perpendicular to the direction of the fluid stream; a deflecting element; rotary means having an axis of rotation perpendicular to the direction of fluid stream and eccentrically mounting said element in the fluid stream between said stream producing means and said body whereby said element alternately deflects the fluid stream against the sides of said body when rotated by said rotary means, said element rotatable with respect to said rotary means about an axis parallel with said first mentioned axis; and means for holding said element in such manner that the element remains parallel with itself when said rotary means rotates.

5. In a driving arrangement for land-, water- and aircraft of the type which is propelled by a fluid stream, in combination, means for producing a fluid stream; a body of airfoil profile having a leading edge and a first and a second side; means mounting said body in the fluid stream in such manner that the leading edge is perpendicular to the direction of the fluid stream and that said body is rotatable about an axis perpendicular to the direction of the fluid stream; means for fixing said body in a plurality of angular positions with respect to said axis; a deflecting element; and rotary means having an axis of rotation perpendicular to the direction of fluid stream and eccentrically mounting said element in the fluid stream between said stream producing means and said body whereby said element alternately deflects the fluid stream against the sides of said body when rotated by said rotary means, said element rotatable with respect to said rotary means about an axis parallel with said first mentioned axis.

6. In a driving arrangement for land-, water-, and aircraft of the type which is propelled by a fluid stream, in combination, means for producing a fluid stream; a body of airfoil profile having a leading edge and a first and a second side, means mounting said body in the fluid stream in such manner that the leading edge is perpendicular to the direction of the fluid stream; a deflecting element of airfoil profile having a leading edge and a geometric chord; and rotary means having an axis of rotation perpendicular to the direction of the fluid stream and eccentrically mounting said deflecting element in the fluid stream between said stream producing means and said body in such manner that the leading edge of said deflecting element is perpendicular to and that said geometric chord is parallel wtih the direction of the fluid stream whereby said element alternately deflects the fluid stream against the sides of said body when rotated by said rotary means, said element rotatable with respect to said rotary means about an axis parallel with said first mentioned axis and located in the plane of said geometric chord.

7. In a driving arrangement for land-, water- and aircraft of the type which is propelled by a fluid stream, in combination, means for producing a fluid stream; a profiled body having two opposite sides; means mounting said profiled body in the fluid stream; deflecting means; and rotary means eccentrically mounting said deflecting means in the fluid stream between said stream producing means and said profile body, said rotary means rotatable about an axis perpendicular to the direction of the fluid stream whereby the deflecting means alternately deflects the fluid stream against the opposite sides of said profiled body when the rotary means rotates.

8. In a driving arrangement for land-, water- and aircraft of the type which is propelled by a fluid stream, in combination, means for producing a fluid stream; a profiled body having two opposite sides; means mounting said profiled body in the fluid stream; deflecting means; rotary means eccentrically mounting said deflecting means in the fluid stream between said stream producing means and said profile body, said rotary means rotatable about an axis perpendicular to the direction of the fluid stream whereby the deflecting means alternately deflects the fluid stream against the opposite sides of said profiled body when the rotary means rotates; and motor means for driving said rotary means.

9. In a driving arrangement for land-, water- and aircraft of the type which is propelled by a fluid stream, in combination, means for producing a fluid stream; a profiled body having two opposite sides; means mounting said profiled body in the fluid stream; deflecting means; and rotary means eccentrically mounting said deflecting means in the fluid stream between said stream producing means and said profiled body, said rotary means rotatable about an axis perpendicular to the direction of the fluid stream whereby the deflecting means alternately deflects the fluid stream against the opposite sides of said profiled body when the rotary means rotates, said fluid stream producing means drivingly connected with said rotary means.

10. In a driving arrangement for land-, water- and aircraft of the type which is propelled by a fluid stream, in combination, means for producing a fluid stream; a profiled body having two opposite sides; means adjustably mounting said profiled body in the fluid stream for movements toward and away from said stream producing means; deflecting means; and rotary means eccentrically mounting said deflecting means in the fluid stream between said stream producing means and said profiled body, said rotary means rotatable about an axis perpendicular to the direction of the fluid stream whereby the deflecting means alternately deflects the fluid stream against the opposite sides of said profiled body when the rotary means rotates.

11. In a driving arrangement for land-, water- and aircraft of the type which is propelled by a fluid stream, in combination, means for producing a fluid stream; a profiled body having two opposite sides; means adjustably mounting said profiled body in the fluid stream for angular movements with respect to the direction of the fluid stream; deflecting means; and rotary means eccentrically mounting said deflecting means in the fluid stream between said stream producing means and said profiled body, said rotary means rotatable about an axis perpendicular to the direction of the fluid stream whereby the deflecting means alternately deflects the fluid stream against the opposite sides of said profiled body when the rotary means rotates.

12. In a driving arrangement for land-, water- and aircraft of the type which is propelled by a fluid stream, in combination, means for producing a fluid stream; a profiled body having two opposite sides; means mounting said profiled body in the fluid stream; deflecting means; rotary means eccentrically mounting said deflecting means in the fluid stream between said stream producing means and said profiled body, said rotary means rotatable about an axis perpendicular to the direction of the fluid stream whereby the deflecting means alternately deflects the fluid stream against the opposite sides of said profiled body when the rotary means rotates; and means adjustably mounting said deflecting means and said rotary means for movements of said deflecting means transversely to the direction of the fluid stream.

13. In a driving arrangement for land-, water- and aircraft of the type which is propelled by a fluid stream, in combination, means for producing a fluid stream; a profiled body having two opposite sides; means mounting said profiled body in the fluid stream; deflecting means; rotary means eccentrically mounting said deflecting means in the fluid stream between said stream producing means and said profiled body, said rotary means rotatable about an axis perpendicular to the direction of the fluid stream whereby the deflecting means alternately deflects the fluid stream against the opposite sides of said profiled body when the rotary means rotates; and means adjustably mounting said rotary means and said deflecting means for movements toward and away from said profiled body.

14. In a driving arrangement for land-, water- and aircraft of the type which is propelled by a fluid stream, in combination, means for producing a fluid stream; a profiled body having two opposite sides; means mounting said profiled body in the fluid stream; deflecting means; rotary means eccentrically mounting said deflecting means in the fluid stream between said profiled body and said stream producing means, said rotary means rotatable about an axis perpendicular to the direction of the fluid stream whereby the deflecting means alternately deflects the fluid stream against the opposite sides of said profiled body; and means including said rotary means and constituting a parallel motion mechanism for maintaining the deflecting means in a position of parallelism with itself when said rotary means rotates.

15. In a driving arrangement for land-, water- and aircraft of the type which is propelled by a fluid stream, in combination, means for producing a fluid stream; a profiled body having two opposite sides; means mounting said profiled body in the fluid stream; deflecting means; rotary means eccentrically and rotatably mounting said deflecting means in the fluid stream between said stream producing means and said profiled body, said rotary means rotatable about an axis perpendicular to the direction of the fluid stream whereby the deflecting means alternately deflects the fluid stream against the opposite sides of said profiled body when the rotary means rotates; and means for adjusting the angular position of said deflecting means with respect to the direction of the fluid stream.

16. In a driving arrangement for land-, water- and aircraft, in combination, means for producing a fluid stream; a body of airfoil profile having a leading edge and a first and a second surface, said surfaces being disposed at the opposite sides thereof; means mounting said body in the fluid stream in such manner that the leading edge is perpendicular to the direction of fluid flow; at least one rotary member of discoid shape; shaft means coaxially connected with said rotary member and perpendicular to the direction of fluid flow; means for rotating said shaft means and said rotary member; a second shaft eccentrically connected with said rotary member, parallel with said shaft means and extending transversely through the fluid stream between said body and said stream producing means; and a deflecting element of airfoil profile rotatably mounted on and having a leading edge parallel with said second shaft, said element alternately deflecting the fluid stream against the opposite sides of said body when said rotary member rotates.

References Cited in the file of this patent

Airplane Design, by E. P. Warner, second edition, McGraw-Hill Book Co., New York and London, 1936. Page 338.